(12) United States Patent
Read

(10) Patent No.: US 8,408,144 B2
(45) Date of Patent: Apr. 2, 2013

(54) HYBRID LOCOMOTIVE REGENERATIVE ENERGY STORAGE SYSTEM AND METHOD

(75) Inventor: David H. Read, Dexter, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 330 days.

(21) Appl. No.: 12/731,326

(22) Filed: Mar. 25, 2010

(65) Prior Publication Data

US 2010/0175579 A1 Jul. 15, 2010

Related U.S. Application Data

(63) Continuation-in-part of application No. 11/807,405, filed on May 29, 2007, now abandoned.

(60) Provisional application No. 60/849,286, filed on Oct. 4, 2006.

(51) Int. Cl.
*B61C 17/00* (2006.01)
(52) U.S. Cl. .......... 105/26.05; 105/35; 105/65
(58) Field of Classification Search .......... 104/289, 104/154; 105/35, 65; 180/305, 306, 165; 290/40 C, 40 B, 40 R, 1 A
See application file for complete search history.

(56) References Cited

U.S. PATENT DOCUMENTS

| | | | | |
|---|---|---|---|---|
| 4,086,856 A * | 5/1978 | Chenoweth | ............ | 105/1.4 |
| 4,095,147 A * | 6/1978 | Mountz | ............ | 318/52 |
| 5,473,990 A * | 12/1995 | Anderson et al. | ............ | 104/85 |
| 5,492,189 A * | 2/1996 | Kriegler et al. | ............ | 180/65.23 |
| 5,495,912 A * | 3/1996 | Gray et al. | ............ | 180/165 |
| 5,623,878 A * | 4/1997 | Baxter et al. | ............ | 104/85 |
| 5,735,215 A * | 4/1998 | Tegeler | ............ | 105/34.1 |
| 5,909,710 A * | 6/1999 | Cummins | ............ | 104/23.2 |
| 6,170,587 B1 * | 1/2001 | Bullock | ............ | 180/69.6 |
| 6,267,062 B1 * | 7/2001 | Hamilton, Jr. | ............ | 105/26.05 |
| 6,719,080 B1 * | 4/2004 | Gray, Jr. | ............ | 180/165 |
| 7,137,344 B2 * | 11/2006 | Kumar et al. | ............ | 105/35 |
| 7,147,078 B2 * | 12/2006 | Teslak et al. | ............ | 180/305 |
| 7,702,432 B2 * | 4/2010 | Bandai et al. | ............ | 701/22 |
| 2004/0251067 A1 * | 12/2004 | Gray et al. | ............ | 180/165 |
| 2005/0039630 A1 * | 2/2005 | Kumar et al. | ............ | 105/35 |
| 2005/0178115 A1 | 8/2005 | Hughey | | |
| 2005/0194054 A1 * | 9/2005 | Moskalik et al. | ............ | 138/31 |
| 2006/0102394 A1 * | 5/2006 | Oliver | ............ | 180/65.2 |
| 2007/0272116 A1 * | 11/2007 | Bartley et al. | ............ | 105/35 |
| 2007/0278027 A1 * | 12/2007 | Gray et al. | ............ | 180/165 |
| 2008/0000381 A1 * | 1/2008 | Bartley et al. | ............ | 105/49 |
| 2008/0083576 A1 * | 4/2008 | Read | ............ | 180/165 |
| 2008/0121136 A1 * | 5/2008 | Mari et al. | ............ | 105/35 |
| 2008/0148993 A1 * | 6/2008 | Mack | ............ | 105/35 |
| 2010/0151989 A1 * | 6/2010 | Read | ............ | 477/4 |
| 2010/0175579 A1 * | 7/2010 | Read | ............ | 105/1.4 |
| 2010/0282122 A1 * | 11/2010 | Mai | ............ | 105/1.4 |

* cited by examiner

*Primary Examiner* — Jason C Smith

(74) *Attorney, Agent, or Firm* — David H. Read

(57) ABSTRACT

An energy storage car for a locomotive includes a hydraulic energy storage system designed to capture and reuse energy normally lost in dynamic braking. The energy storage car is preferably configured to provide functions sufficient to replace one of multiple locomotives used to pull a freight train. Braking and other methods for improved efficiency of such trains are provided.

11 Claims, 7 Drawing Sheets

HYBRID LOCOMOTIVE REGENERATIVE ENERGY STORAGE SYSTEM AND METHOD

CROSS-REFERENCE TO RELATED APPLICATIONS

This application is a continuation-in-part of U.S. application Ser. No. 11/807,405, filed May 29, 2007 now abandoned, with priority to provisional application 60/849,286, filed Oct. 4, 2006.

FIELD OF THE INVENTION

The present invention relates to regenerative energy storage systems, particularly to those adapted for use with hybrid trains or locomotives.

DESCRIPTION OF THE RELATED ART

Hybrid powertrains have been investigated as a means to reduce fuel consumption and reduce harmful emissions in motor vehicles, including trains. Hybrid electric powertrains are the most commonly investigated hybrid vehicle powertrain. Hybrid electric powertrains have been found capable of reducing fuel consumption and harmful emissions in some applications, with certain drawbacks.

Two principal drawbacks for hybrid electric powertrains for heavy vehicles are that the storage batteries for such powertrains are expensive, and that current batteries which are not completely cost-prohibitive are severely limited in their ability to quickly capture and store large bursts of energy such as may occur in attempted regenerative braking of a heavy or fast-moving vehicle. As a result, with state of the art hybrid electric technology, a typical hybrid electric passenger car is able to recover and re-use on average only about one-third or less of its kinetic energy lost in braking, a typical prototype heavy-duty hybrid electric truck or bus can recover and re-use only about 15-20% of its kinetic energy lost in braking, and an extremely heavy vehicle such as a hybrid electric locomotive with freight would be expected to recover and re-use only a very small percentage of its kinetic energy in braking. The cost and size of the battery pack needed also greatly increases with the increase in vehicle weight and energy to store.

In addition, the ability to significantly buffer engine operation (i.e., maintain engine operation at good efficiency levels through use of the secondary power system to add or subtract power to the engine output to meet vehicle demand) is limited for hybrid electric powertrains where the engine is large (again because of the limited efficient charge/discharge rates for batteries which reduce efficiency and durability when charging or discharging at high power levels), such as in heavy vehicles, trains or locomotives.

It is therefore desirable to provide a hybrid powertrain system with the capacity to capture and store energy lost in braking and/or through engine operation buffering in switcher locomotives and freight trains, with good cost and efficiency.

Freight trains also typically require the use of more than one locomotive in order, among other things, to meet the temporary high power demands required for accelerating the heavy train from a stop or maintaining minimum speeds up a grade. Sometimes the additional locomotive is otherwise unnecessary. As each locomotive is expensive (a new locomotive can cost above $2 million US dollars), it would therefore also be desirable to reduce the number of locomotives needed per freight train by meeting the train's occasional high power demands in a more efficient manner.

OBJECTS OF THE INVENTION

It is therefore one object of the present invention to provide a commercially viable hybrid powertrain and regenerative braking energy storage system for very heavy vehicles, particularly switcher locomotives and freight trains.

It is also an object of the invention to provide improved methods of operation to improve the cost-effectiveness for the reduction of fuel consumption in such vehicles.

SUMMARY OF THE INVENTION

In one embodiment of the present invention, a regenerative energy storage system for a train is provided. One or more electric motor/generators are provided to receive a portion of dynamic braking electrical energy generated from the locomotive's traction motors during braking, and convert the electrical energy to mechanical energy in the form of a rotating shaft. The mechanical energy is then converted by one or more pump/motors to hydraulic pressure, which is then stored by pumping low pressure fluid from a low pressure reservoir to high pressure and storing the pressurized fluid within a high pressure accumulator on the energy storage car or locomotive. When needed, the stored pressure may be re-used by using the high pressure fluid to run the pump/motors as motors to drive the electric motor/generators to produce electrical energy which may then be sent to the traction motors to propel the train. An electric storage battery may also be provided, for direct storage of a portion of electricity from either the main generator (e.g., when driven by the engine) or the drive motor/generators (e.g., when driven by the wheels in regenerative dynamic braking) within the battery's efficient charging rate.

In a more preferred embodiment, braking may be performed directly by a hydraulic energy storage system simultaneously with electric dynamic braking on a train. A portion of electrical power generated in dynamic braking may be stored in a battery. Braking may also be performed hydraulically, through using a portion of the kinetic energy of the train to drive one or more hydraulic pump/motors as pumps to pressurize fluid for storage in one or more high pressure accumulators on board the train. The pressurized fluid may then be used to drive the pump/motor(s) to help propel the train.

In another embodiment, a diesel-hydraulic switcher locomotive with on-board hydraulic energy storage is provided. A diesel-hydraulic locomotive is used instead of a diesel-electric switcher locomotive to avoid conversion losses involved in converting between electrical and hydraulic energy. Thus, in this embodiment, a main internal combustion engine of the locomotive drives a first hydraulic pump/motor as a pump to provide pressurized fluid to drive one or more hydraulic pump/motors as motors for propulsion. The first pump/motor and drive pump/motors may operate together much as a hydrostatic transmission, as is known in the art. One or more high pressure accumulators are provided for storage of pressurized fluid from either the first hydraulic pump/motor (driven by the engine) or the drive hydraulic pump/motors (e.g., when used for regenerative "braking" or slowing).

An improved method of braking a hydraulic-electric hybrid train or locomotive also comprises performing braking events or downhill descents in stages, to allow capture of energy in the hydraulic system in a first braking stage, transfer of that energy from the hydraulic system to an electrical storage battery during a rest in the braking event, then continuing with capture of additional energy in the hydraulic system during a second braking stage. Additional stages may be used as desired. Ascension of a long grade may also be made in stages, with a locomotive engine recharging the energy storage device between stages.

Great cost savings may be achieved with the present invention by enabling substitution of the energy storage cars or locomotives of the present invention for one or more of multiple locomotives used for freight train routes. This could be done on a route-by-route basis. The energy storage car could be sized to deliver comparable horsepower to the omitted locomotive when needed. The savings gained in not needing a locomotive, and/or being able to redeploy the locomotive for other use, is significant.

DETAILED DESCRIPTION OF THE INVENTION

Figure 1:
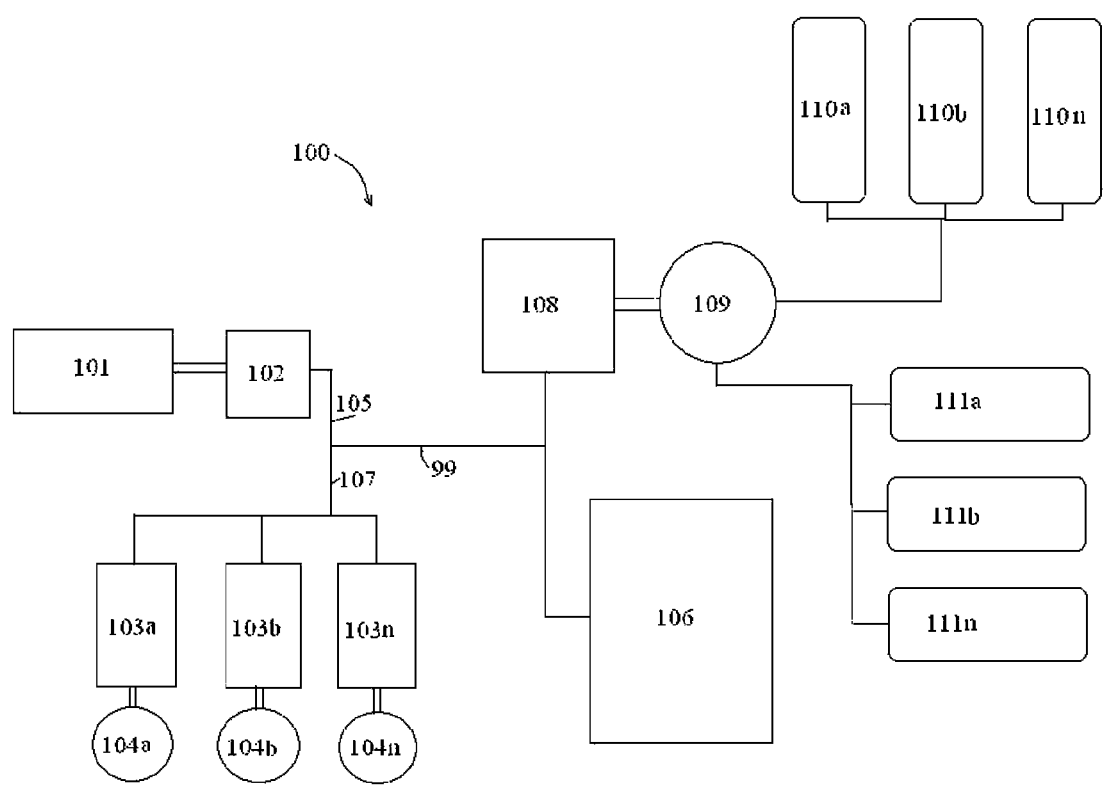
FIG. 1 is a schematic diagram of a powertrain of the present invention.

FIG. 1 is a schematic diagram of a powertrain of the present invention for use in conjunction with a diesel-electric locomotive. For simplicity sake in presenting each of the figures herein, common elements such as switches, inverters, and valves are not shown, but will be understood to exist as needed for the system to operate. These elements are well-known and easily incorporated by those with skill in the art(s).

Referring to FIG. 1, in diesel-electric locomotive 100, an internal combustion engine 101 drives a main electric/motor generator 102 to provide electric current through lines 105 and 107 to drive multiple electric motor/generators 103a, 103b . . . to 103n, as motors to drive wheels 104a, 104b . . . to 104n of the locomotive. Any actual number of motors and/or wheels may be used. Propulsion of the locomotive is performed as a known diesel-electric locomotive.

In dynamic braking, electrical power generated by the traction motors 103a-n is routed to another motor/generator 108, which then operates as a motor to mechanically drive hydraulic pump/motor 109 as a pump. When driven by motor 108, pump/motor 109 pumps fluid from low pressure accumulators 110a-n to a bank of high pressure accumulators 111a-n, for additional storage of energy. Any number of accumulators may be used. Multiple fluid ports and hose lines may be used per accumulator for increased flow capability (and thus power transfer capability) per accumulator, to reduce the number of accumulators if desired.

By way of example in discussing energy storage, a high pressure accumulator with fluid pressure of 5000 psi can accept or discharge power up to about 250 kW per hose line, assuming a conventional hose line that allows flow of 120 gallons per minute. The number and size (volume) of accumulators used will of course be a matter of design choice depending on, for example, the train's weight and duty cycle, including anticipated peak braking power levels and total braking energy for a braking event. For a large freight train, a desirable total high pressure accumulator volume could far exceed 10,000 gallons. Stored energy in accumulators 111a-n may later be used for supplemental power in propelling the locomotive (e.g., running pump/motor 109 as a motor to drive generator 108 to send electricity to motor/generators 103a-n to drive wheels 104a-n).

In the embodiment of FIG. 1, an electric storage battery 106 is also provided for storage of a portion of electricity generated from either generator 102 (e.g., excess energy when buffering the power output from engine 101), via line 99, or from motor/generators 103a-n (e.g. for regenerative dynamic braking, via lines 107 and 99). In the event of dynamic braking, electricity generated by motor/generators 103a-n is conveyed by lines 107 and 99 for storage in battery 106 to the extent battery 106 can efficiently accept the charge. Likewise, in the event of engine buffering, electricity generated by generator 102 is conveyed by lines 105 and 99 for storage in battery 106 to the extent battery 106 can efficiently accept the charge. In either case, electrical power beyond the efficient charging rate of battery 106 is preferably routed to motor/generator 108, which then operates as a motor to drive hydraulic pump/motor 109 as a pump in order to store the energy as fluid pressure within the accumulators 111a-n. An electrical resistance grid (not shown in FIG. 1, but shown as 114 in FIG. 2) may also be provided to dissipate excess electrical energy not capturable in battery 106 and accumulator(s) 111.

Figure 2:
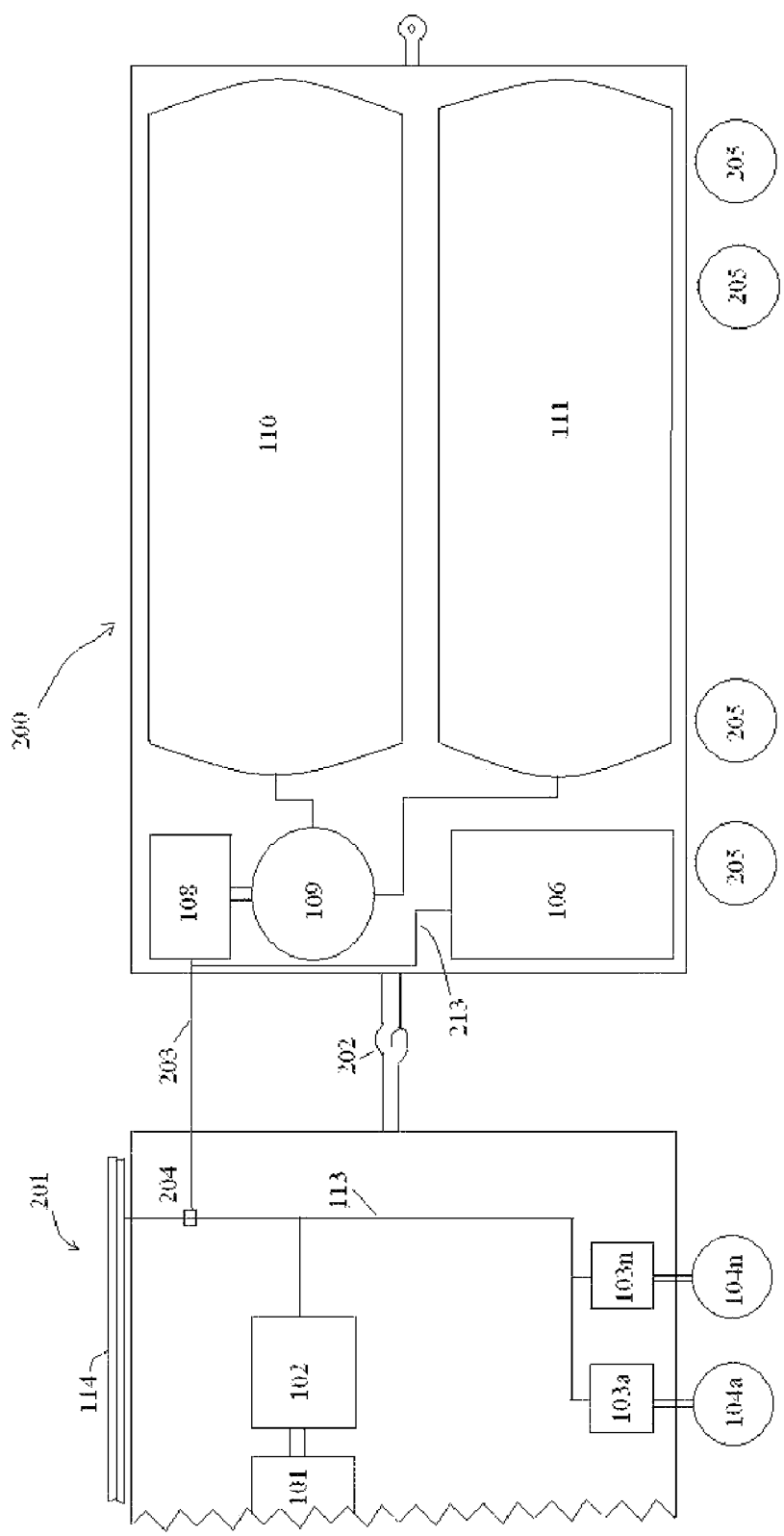
FIG. 2 is a schematic diagram of an energy storage car of the present invention.

As most locomotives stay in service for many years, the environmental and energy-saving benefits of this technology may be maximized by retrofitting existing diesel-electric locomotives as well. For ease of packaging, each of the additional components could be placed into a freight car that attaches behind the conventional locomotive as illustrated in FIG. 2. To facilitate the retrofitting process by reducing the initial cost of the retrofit to the user, the costs of the retrofit and energy storage train car could be paid to the retrofitter as a percentage of fuel savings, if desired.

Referring to FIG. 2, an energy storage train car 200 that could be used in conjunction with a slightly-modified conventional diesel-electric locomotive 201 is presented. Items numbered identically to items in FIG. 1 perform equivalent functions and therefore will not again be discussed with regard to FIG. 2. Further, FIG. 2 illustrates that accumulators 110a-n and 111a-n may be replaced with single large volume accumulators 110 and 111 in any of the embodiments if desired. The conventional diesel-electric locomotive 201 is portrayed here to include an electrical line 113 that connects motor/generators 103a-n to resistance grid 114 for conversion of electrical energy to dissipating heat energy during dynamic braking, as is common in the art.

In the embodiment of FIG. 2, the energy storage train car 200 is detachably mechanically connected to locomotive 201 by mechanical connection 202, which could comprise any known means in the art for detachable coupling of train cars. Electrical line 203 extends from the energy storage car 200 and is adapted with a connector 204 to connect into and intercept electrical current passing through line 113 during regenerative braking, and to instead transmit at least a portion of that electrical energy through line 203 to motor/generator 108 to drive pump/motor 109 as a pump for energy storage. In addition, or in the alternative, a portion of the electrical energy may be sent to storage battery 106 via line 213 for energy storage.

As with the embodiment of FIG. 1, engine 101 may also be used for charging of the battery 106 (through generator 102 and electrical lines 203 and 213) or high pressure accumulator 111 (through generator 102 generating electricity to drive electric motor 108 to drive pump 109 to pressurize fluid in accumulator 111), if desired.

Figure 3:
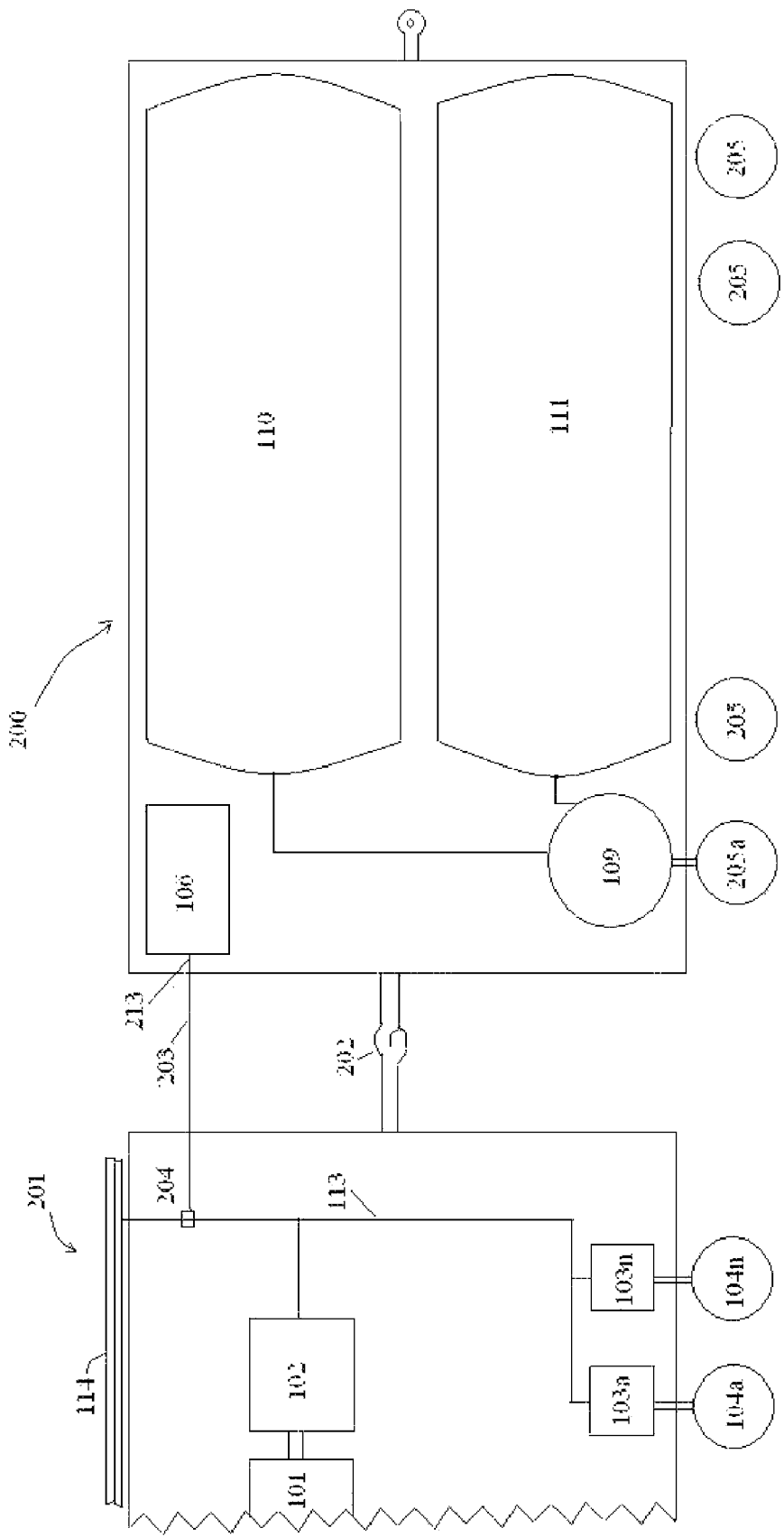
FIG. 3 is a schematic diagram of the most preferred embodiment of an energy storage car of the present invention.

In a most preferred car embodiment, presented in FIG. 3, pump/motor(s) 109 are mechanically connected directly to wheels 205a (e.g., by connection to the axle (not shown)) of car 200, for assistance in braking by direct conversion of the train's kinetic energy to fluid pressure (through wheels 205a driving pump 109 as a pump to pressurize fluid) for storage in accumulator 111, without the need for conversion of such energy to electrical energy. Likewise, in using the stored hydraulic energy to propel the train, pump/motor(s) 109 may be driven by the pressurized fluid in accumulator 111 to drive wheels 205a without the need for conversion of such energy to electrical energy. A battery 106 is still preferably located on car 200 for storage and re-use of electrical energy from regenerative braking through fraction motor(s) 103a-n or from engine buffering, as described for FIGS. 1 and 2. The hydraulic and electric energy storage systems present in FIG. 3 may be used either simultaneously or not, as desired. Preferred methods for simultaneous use will be described hereafter.

Benefits of the locomotive embodiments herein will now be discussed. As stated above, in an extremely heavy vehicle such as a locomotive (especially if carrying freight), even the most cost effective electrical battery system would likely recover and re-use much less than 10% of the kinetic energy in braking. The cost and size of the battery pack needed also greatly increases with the increase in vehicle weight and increased energy storage needs. For example, using sample figures, assume a locomotive itself weighs 700,000 kilograms, and the freight train in total weighs eight million kilograms. In braking such a freight train through dynamic braking in the locomotive, the bursts of energy produced may reach three or four thousand kilowatts. Batteries currently cannot capture such large amounts of power in a manner that would be cost-effective (justified by fuel savings) for a line-haul locomotive application. However, the embodiments disclosed herein would enable cost-effective energy storage for trains.

Figure 4:
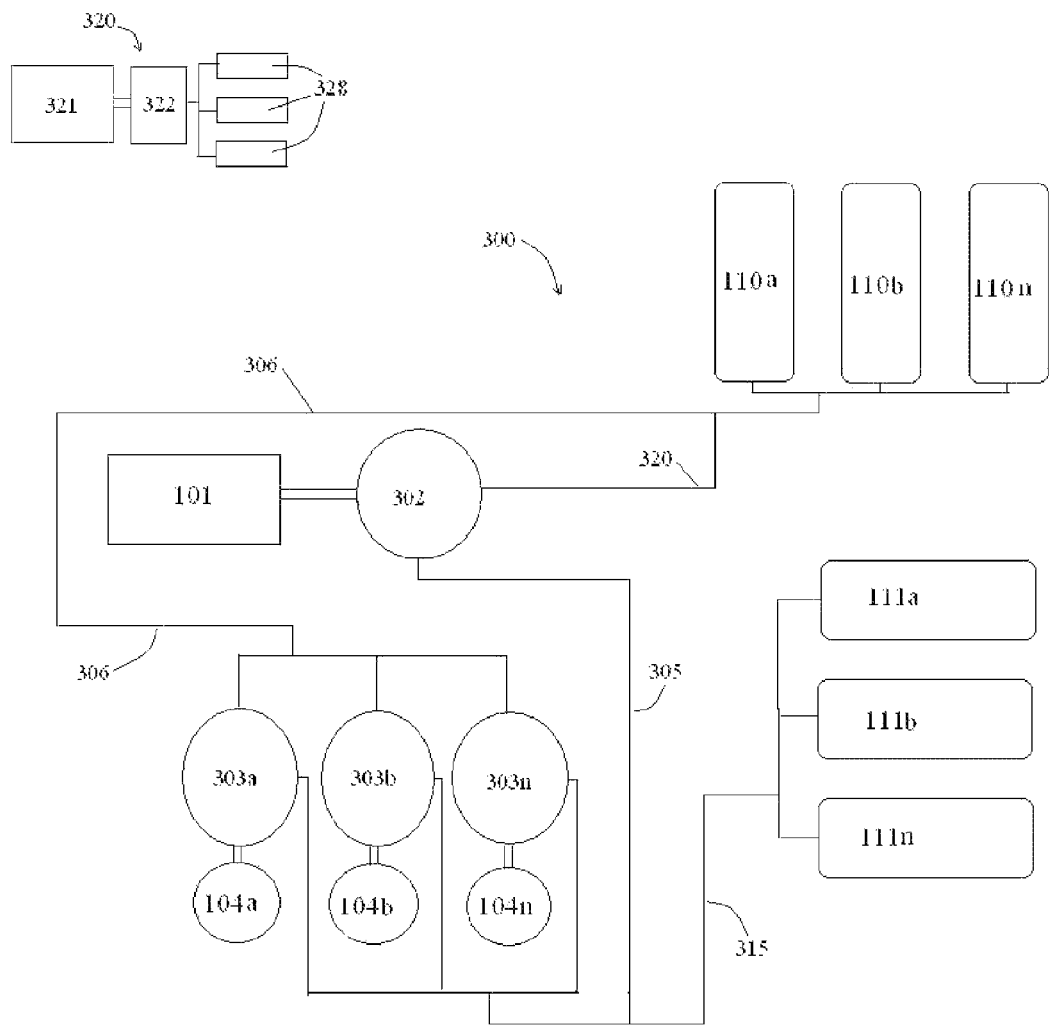
FIG. 4 is a schematic diagram of a hydraulic hybrid powertrain for a switcher locomotive of the present invention.

As a most preferred locomotive embodiment specifically for railyard "switching" applications instead of line-haul use, a drivetrain for a hydraulic hybrid switcher locomotive 300 is schematically presented in FIG. 4 which further (1) reduces the number of components and (2) avoids the need for conversion (with related losses) of electrical energy to hydraulic energy and vice versa (from FIGS. 1 and 2). Items numbered identically to items in FIG. 1 perform equivalent functions and therefore will not again be discussed with regard to FIG. 4.

Referring to FIG. 4, internal combustion engine 101 drives a first main pump/motor 302 to pump fluid from one or more of low pressure accumulators 110a-n (via line 320) to high pressure. This pressurized fluid is then sent through hydraulic line 305 to drive multiple hydraulic pump/motors 303a, 303b ... 303n, as motors to drive wheels 104a-n of the locomotive, with low pressure fluid returning to one or more low pressure accumulators 110a-n through fluid line 306. High pressure accumulators 111a-n are provided for storage of a portion of pressurized fluid from pump/motor 302 (e.g., through line 315, due to excess energy when buffering the engine 101). In the event of regenerative braking, low pressure fluid from low pressure accumulators 110a-n via line 306 is pressurized by pump/motors 303a-303n and conveyed by lines 305/315, also for storage in high pressure accumulators 111a-n. The number and volume of accumulators used is a matter of design choice depending on, for example, the train's weight and duty cycle. Stored energy in accumulators 111a-n may later be used to supplement power in moving the locomotive (e.g., sending pressurized fluid through line 315 to run pump/motors 303a-n as motors to drive wheels 104a-n).

The hydraulic hybrid locomotive of FIG. 4 may also be provided with a small auxiliary power unit (APU) 320. APU 320 comprises small internal combustion engine 321 and electric generator 322, to provide energy for air conditioning and other equipment and accessories (together represented collectively as 328), allowing extended engine-off periods (and reduced idling) of main engine 101. In some duty cycles, idling of the main engine 101 with a conventional drivetrain would otherwise be needed as much as 60% of the time. One commercially available APU goes by the name "K9."

While the preferable use for the configuration of FIG. 4 is as a locomotive switcher in a switching yard, the locomotive of FIG. 4 could also be used for line-haul applications. A switching duty cycle is most preferred because of the frequent stop-go cycling, with high power bursts of short duration typical of such duties, which are especially suitable for the sole use of hydraulics for energy capture and reuse.

Figure 5A:
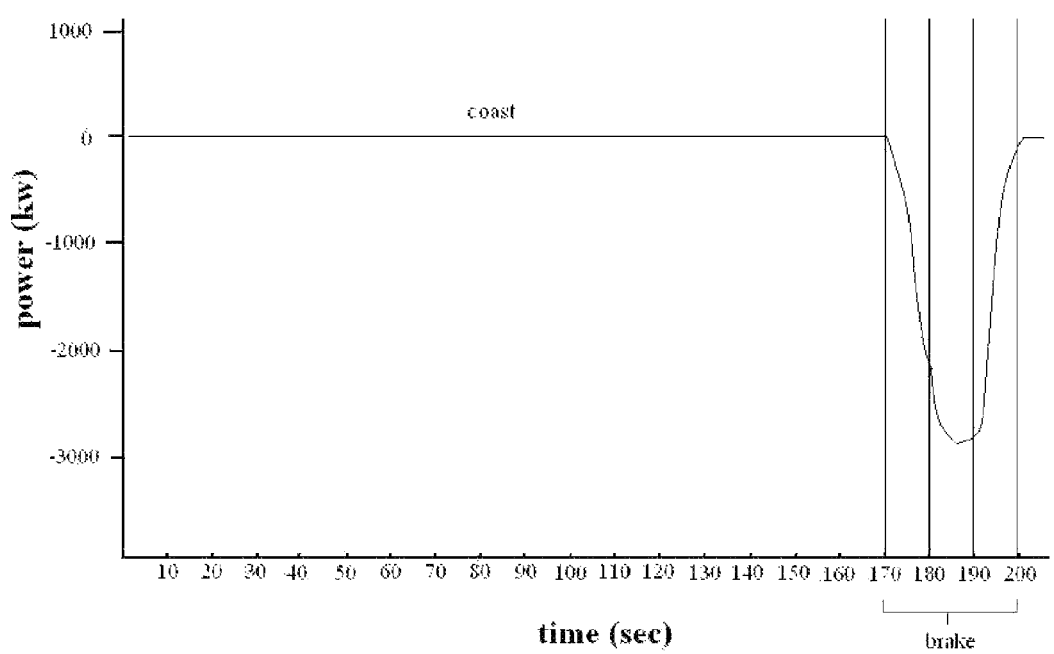
FIG. 5A presents power flows in a braking event in accordance with prior art.
Figure 5B:
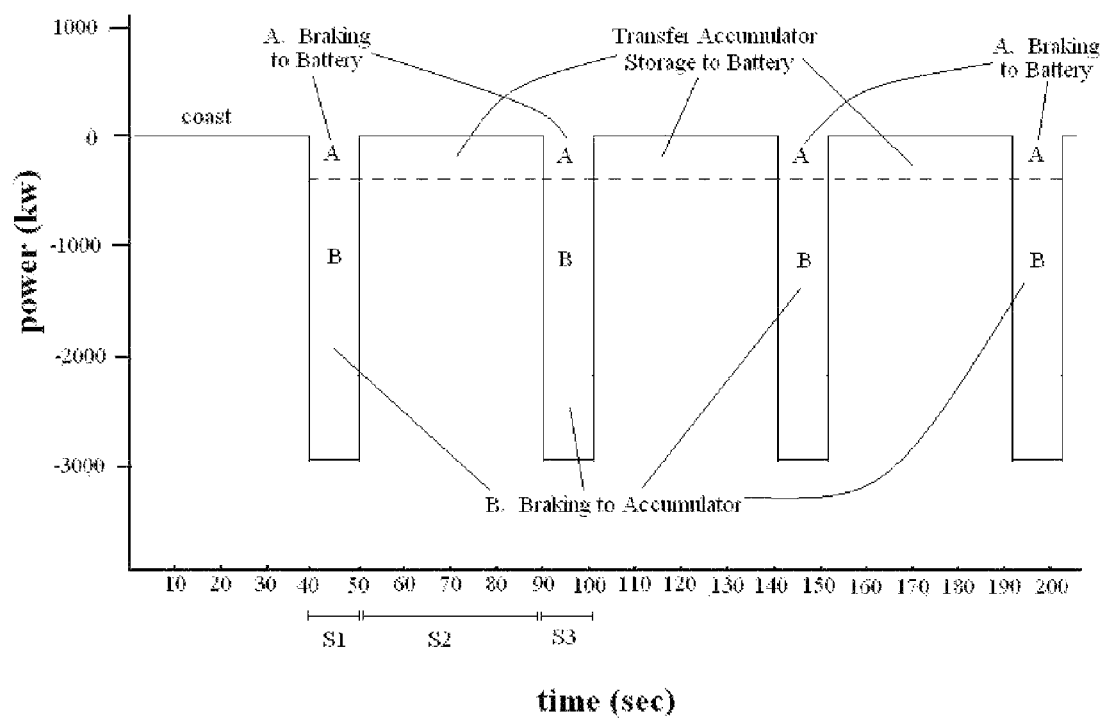
FIG. 5B presents power flows and distribution of braking power in a braking event performed in accordance with principles of one aspect of the invention.

With the hydraulic-electric hybrid trains described herein for FIGS. 1-3, cost savings and fuel reduction savings could also be increased in line-haul applications if used in conjunction with a more cost-effective method of braking FIG. 5A presents power flow (a negative power flow indicating flow of power received by the train in dynamic braking) leading up to and during a sample braking event of a line-haul locomotive according to the prior art. FIG. 5B presents power flows in a braking event performed in accordance with additional principles of the present invention. Referring to FIG. 5B, the braking event is broken up into multiple stages over time to allow cost-effective capture and storing of the braking energy. The same principles could be used for slowing or limiting train speed while descending a long grade. In either case, in the first step, S1, dynamic braking is performed, with a first portion A of the braking energy stored from the traction motor/generators to a battery 106 at an efficient charging rate for the battery. Simultaneously, additional braking energy B is stored through the hydraulic system in the accumulator(s) 111a-n. As the energy storage in the accumulators 111a-n approaches capacity at the end of S1, dynamic braking is then stopped in step S2, as energy storage is then transferred from accumulators 111a-n through pump/motor(s) 109 (as a motor) and motor/generator 108 (as a generator) (or, alternatively, 103a-n as generators for FIG. 3) to the storage battery 106. As the accumulators now reach again a low threshold value of energy storage near the end of S2, train braking (for a stop or to slow a downhill descent) is commenced again in step S3 in the same manner as for step S1. Further stages may be used as needed until the braking event is complete. At the end of the braking event, the accumulators preferably retain some energy storage for use in subsequent relaunching after the stop.

Although the preferred method of braking for greater recovery of energy set forth above would take longer than conventional braking, it may be acceptable in situations where braking may be planned in advance (e.g. descending known grades and on train routes with preset stopping points). For best efficiency, the staged braking would be controlled by a microprocessor (not shown) which receives accumulator energy storage level inputs. Activation of the braking method could occur through a driver-operated button or switch, e.g. when conditions are right. Through use of this braking method in conjunction with the apparatus herein, a smaller, lighter and less expensive energy storage system may be used, and a more attractive cost payback obtained.

Figure 6:
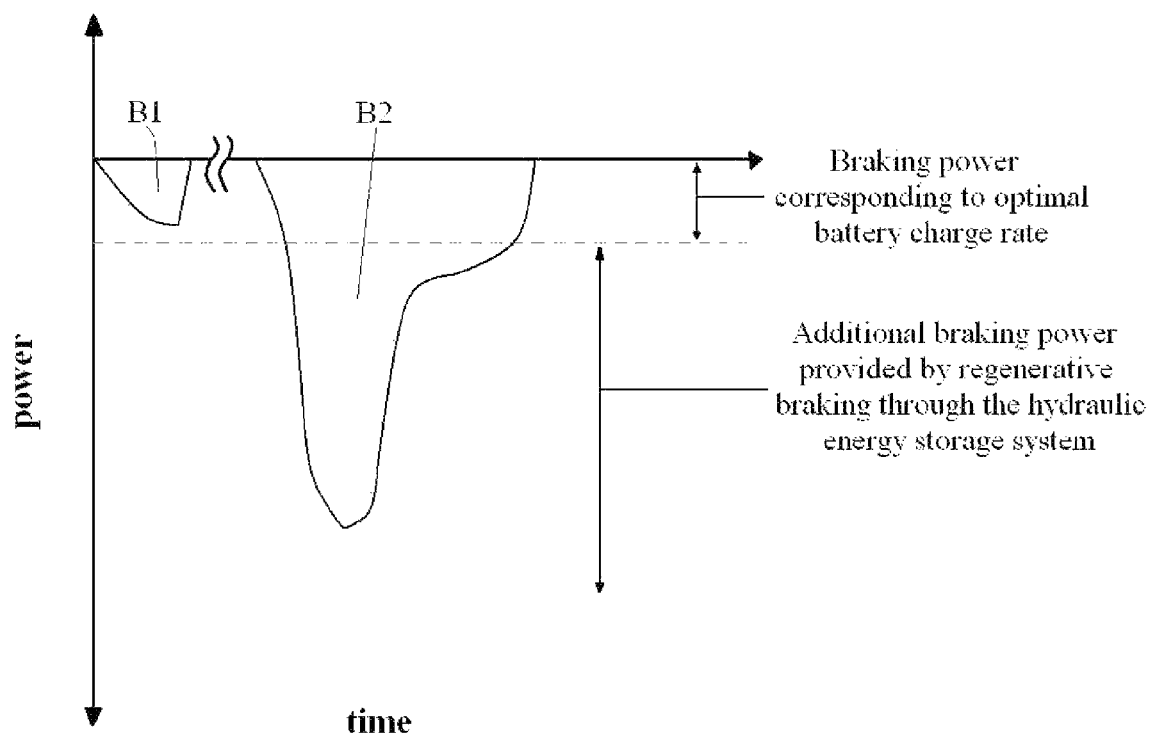
FIG. 6 presents power flows and distribution of braking power in a braking event performed in accordance with principles of another aspect of the invention.

It should be noted that for some braking events it may be possible to capture all of the braking energy without a phased braking process, or it may be impractical to split the braking process into stages. In such events, it would generally be most efficient to capture all of the braking energy through the hydraulic energy storage system to the extent possible. However, there may be occasions where greatest overall efficiency would come from simultaneous braking through the electric and hydraulic energy storage systems. In such events, referring to FIG. 6, it would be preferable to limit the charging rate to the battery. This is because, e.g., battery charging efficiencies are reduced at high charging rates. With a hydraulic energy storage system on board, the need to charge the battery pack at high charge rates may be minimized, and the overall efficiency in regenerative braking may be kept high. For example, in sample braking events B1 and B2 in FIG. 6, braking is preferentially performed by the electric system up to a certain level of braking power at which electric braking can be performed at a high regenerative efficiency. For a very light braking event such as B1, this will result in the braking event being handled solely through electric regenerative braking. However, for a sample braking event B2, whatever additional braking power is needed to meet the desired braking demand will be supplied through hydraulic regenerative braking. Further detail is provided in the inventor's co-pending related U.S. application Ser. No. 12/711,603, which description is incorporated herein by reference in its entirety.

It should be noted that, because of the extremely low rolling resistance of trains, and because of the regenerative braking system's high capacity for capturing and re-using braking energy efficiently herein, any weight gain from the additional components required for the systems above will not significantly undermine the train's fuel efficiency.

The benefits obtained by the inventions herein for any particular vehicle will, of course, be significantly affected by the duty cycle. For example, the fuel efficiency benefits of the energy storage configurations herein will be much higher for duty cycles involving frequent stop-and-go operation, such as for a switcher locomotive, as will be understood in the art.

As mentioned above, the benefits obtained by the inventions herein will also be maximized for line-haul applications if the energy storage systems herein enable the use of fewer locomotives in a locomotive consist than would otherwise be needed for a given freight and route. For example, for trips where one or more of the locomotives that are used for the consist are needed only to improve acceleration and meet brief peak power requirements (such as to maintain a minimum speed, e.g., 20-30 mph, up a grade) for the trip, an energy storage car such as that in FIG. 2 or 3 could replace one or more of the locomotives for the trip to (1) save fuel and (2) effectively extend the operator's useable locomotive fleet. For a company with a growing locomotive fleet, being able to reduce the number of additional locomotives needed to meet freight demand, by use of less expensive energy storage cars in place of one or more locomotives on various consists, would provide a significant economic benefit.

It has been noted for the embodiments above that the engine 101 may be used to charge one or both of the energy storage devices. As such, in the event that the locomotive power is insufficient on its own to perform a desired task (e.g., to ascend a grade, accelerate from a stop, or limp home in the event one or more locomotives in the consist become non-operational), the engine may be used to charge an energy storage device and the energy storage device may then be used to help perform the task. For example, if the locomotive power is insufficient to ascend a grade, stored energy from the energy storage device may be used to supplement the locomotive's internal combustion engine's output. And, in the event that the energy storage device has declined to a preset minimum energy storage level while the train is still attempting to ascend the grade, the train may temporarily stop while the internal combustion engine is used to recharge the energy storage device to a desired level. Once recharged, the train again may proceed up the grade with the newly stored energy in the energy storage device again used to supplement the locomotive's internal combustion engine's output. This process may be repeated as necessary. Likewise, for starting the train from a stop, the internal combustion engine(s) may first be used to charge the battery or build fluid pressure in the accumulator(s), which can then be used to help with initial launch of the train if desired.

From the foregoing it will be appreciated that, although various specific embodiments of the invention have been set forth herein, further modifications could also be made without deviating from the spirit and scope of the invention. For example, it will be well-understood that either more or fewer hydraulic lines may be utilized, higher or lower hydraulic pressure may be used, and that operatively connected devices may be integrated, rearranged, or separated with mechanical or other intervening links, as may be desired. It will also be understood that various aspects of the different embodiments could be combined or switched without affecting the basic invention. The energy storage devices and methods herein could also be beneficial for other on-road and off-road heavy vehicles and operations, such as for heavy duty mining trucks.

Therefore, the scope of the present invention is intended to be limited solely by the claims presented herein.

I claim:
1. A hybrid freight train, comprising:
at least one locomotive with an internal combustion engine;
a plurality of train cars;
a pump/motor mounted on the freight train and configured, in one mode, to be driven as a pump by mechanical rotational energy generated as a result of braking of the train, to pump a working fluid from a low pressure to a high pressure, and wherein the pump/motor is further configured, in a second mode, to be driven by pressurized fluid, to provide power output to help propel the train;
a high pressure hydraulic accumulator, carried by at least one of the train cars and fluidly connected to the pump/motor, for storage under pressure of the working fluid pressurized by the pump/motor and for supply of pressurized fluid to the pump/motor to help propel the train; and
wherein the collective peak power outputs from internal combustion engines on the locomotives of the train are insufficient to propel the train up one or more grades in the train's route at a minimum speed of at least 20 miles per hour without the power assistance provided by the pump/motor being driven by the pressurized fluid stored and supplied by the high pressure hydraulic accumulator.
2. The train of claim 1, further comprising:
a first electric motor/generator mounted on a locomotive of the freight train, configured to generate electrical energy in dynamic braking of the train; and an electric storage battery carried by the train and configured to store a portion of the electrical energy generated by the first electric motor/generator in dynamic braking of the train.

3. The train of claim 2, wherein the pump/motor comprises a mechanical drive shaft mechanically connected to wheels of the train, and the pump/motor is configured to be driven by the wheels during braking of the train, to thereby pressurize fluid for storage in the high pressure accumulator, without first converting the mechanical energy of the wheels to electrical energy.

4. The train of claim 2, further comprising a second electric motor/generator that is configured to be driven as a motor by the electrical energy generated by the first electric motor/generator, and wherein the second electric motor/generator and the pump/motor are mechanically connected, and the second electric motor/generator is configured to mechanically drive the pump/motor during dynamic braking, to thereby pressurize fluid for storage in the high pressure accumulator.

5. The train of claim 4, further comprising:
a third electric motor/generator mounted on a locomotive of the freight train, said third electric motor/generator being configured to be driven by the internal combustion engine of the locomotive; and
wherein the second electric motor/generator is further configured to receive electrical energy generated by the third electric motor/generator and mechanically drive the pump/motor, to thereby pressurize fluid for storage in the high pressure accumulator.

6. The train of claim 5, wherein the electric storage battery is further configured to store a portion of the electrical energy generated by the third electric motor/generator.

7. The train of claim 1, wherein the pump/motor comprises a mechanical drive shaft mechanically connected to wheels of the train, and the pump/motor is configured to be driven by the wheels during braking of the train, to thereby pressurize fluid for storage in the high pressure accumulator, without first converting the mechanical energy of the wheels to electrical energy.

8. A hydraulic hybrid locomotive, comprising:
drive wheels;
an internal combustion engine connected to an on-board tank containing liquid fuel, to combust the liquid fuel and generate power for use in the locomotive;
a first hydraulic pump/motor, configured to be driven by the internal combustion engine, for pressurizing fluid;
a high pressure hydraulic accumulator mounted on the locomotive, configured to selectively store and release energy in the form of pressurized fluid; and
a second hydraulic pump/motor, mechanically linked to the drive wheels and configured in motor mode to be driven by pressurized fluid from the first hydraulic pump/motor or the high pressure accumulator, to propel the locomotive, and further configured in pump mode to be driven by the kinetic energy of the vehicle to pressurize fluid for storage in the high pressure hydraulic accumulator.

9. The locomotive of claim 8, further comprising an auxiliary power unit comprising a second internal combustion engine and an electric generator, for production of electricity for use in the locomotive.

10. A hydraulic-electric train, comprising:
a first plurality of electric motor/generators, mechanically connected to the drive wheels of a locomotive of the train, said first plurality of electric motor/generators configured to be driven by the drive wheels as generators generating electrical energy during a braking event for the locomotive;
a storage battery, electrically connected to the first plurality of electric motor/generators and configured to store a portion of electrical energy generated by the motor/generators at a power level within an efficient charging rate for the battery; and
a hydraulic pump/motor configured also to be driven, as a pump, during the braking event, by either the drive wheels or an electric motor, using energy from the braking event for the locomotive, and thereby converting to fluid pressure for storage in a high pressure hydraulic accumulator a portion of energy from the braking event which could not be stored in the battery within the efficient charging rate for the battery.

11. A hybrid freight train, comprising:
a plurality of locomotives, each with an internal combustion engine mounted therein;
a plurality of train cars;
a pump/motor mounted on the freight train and configured, in one mode, to be driven as a pump by mechanical rotational energy generated as a result of braking of the train, to pump a working fluid from a low pressure to a high pressure, and wherein the pump/motor is further configured, in a second mode, to be driven by pressurized fluid, to provide power output to help propel the train;
a high pressure hydraulic accumulator, carried by one of the train cars and fluidly connected to the pump/motor, for storage under pressure of the working fluid pressurized by the pump/motor and for supply of pressurized fluid to the pump/motor to help propel the train; and
wherein the collective peak power outputs from internal combustion engines on the locomotives of the train are insufficient to propel the train up one or more grades in the train's route at a minimum speed of at least 20 miles per hour without the power assistance provided by the pump/motor being driven by the pressurized fluid stored and supplied by the high pressure hydraulic accumulator.

* * * * *